United States Patent [19]

Yoshikai

[11] Patent Number: 4,726,764
[45] Date of Patent: Feb. 23, 1988

[54] HEAT TREATING APPARATUS AND METHOD OF OPERATING HEAT TREATING APPARATUS

[75] Inventor: Terunao Yoshikai, Ichihara, Japan

[73] Assignee: The Furukawa Electric Co., Ltd., Tokyo, Japan

[21] Appl. No.: 865,445

[22] Filed: May 21, 1986

[30] Foreign Application Priority Data

May 22, 1985 [JP] Japan ................. 60-108415

[51] Int. Cl.[4] .................. F27D 7/00; F25D 19/00
[52] U.S. Cl. ...................... 432/24; 432/47; 432/205
[58] Field of Search .............. 432/23, 24, 47, 48, 432/152, 205; 34/15, 51

[56] References Cited

U.S. PATENT DOCUMENTS 4,561,309 12/1985 Rosner .................. 34/51

OTHER PUBLICATIONS

Mirza et al., Clean Oven, IBM Technical Disclosure Bulletin, vol. 14, No. 8, Jan. 1972, 34-51.

Primary Examiner—Harry Tanner
Attorney, Agent, or Firm—Schwartz, Jeffery, Schwaab, Mack, Blumenthal & Evans

[57] ABSTRACT

A heat treating apparatus which comprises a core tube for containing a material to be treated, a heating furnace surrounding the core tube, core tube gas supply means for supplying gas into the core tube, furnace gas supply means for supplying gas into a furnace body of the furnace, differential pressure detecting means for detecting the differential pressure between the pressure in the core tube and the gas pressure in the body, and differential pressure regulating means for regulating the differential pressure between the gas pressure in the core tube and the gas pressure in the body on the basis of a differential pressure signal from the detecting means. The apparatus is operated by regulating the gas pressure in the core tube so that the differential pressure between the gas pressure in the core tube and the gas pressure in the body fall within a tolerable range, thereby preventing the core tube from deforming.

4 Claims, 4 Drawing Figures

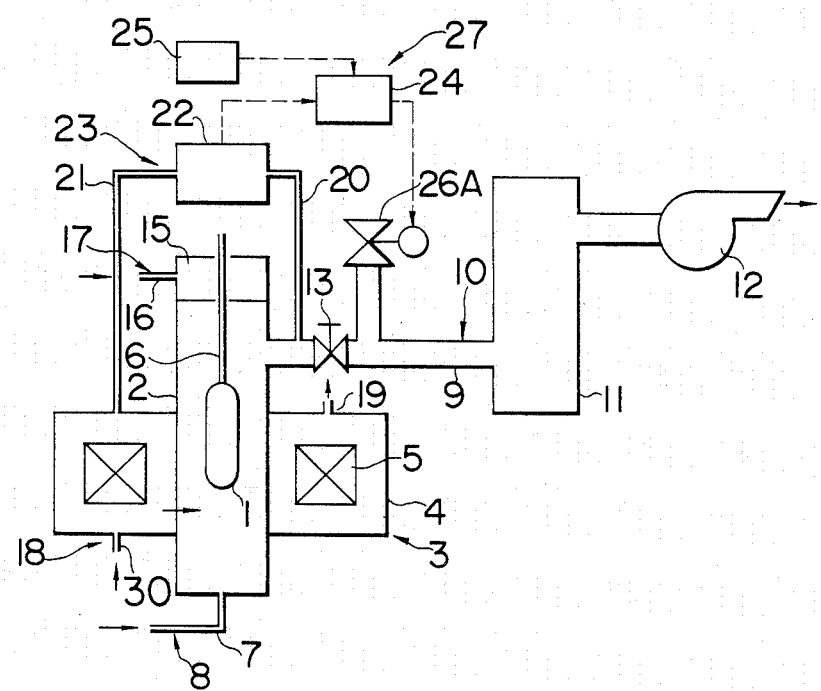
F I G. 1
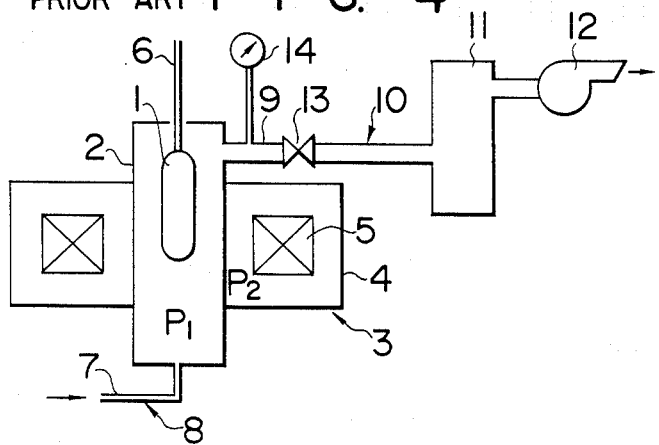
PRIOR ART F I G. 4

F I G. 2
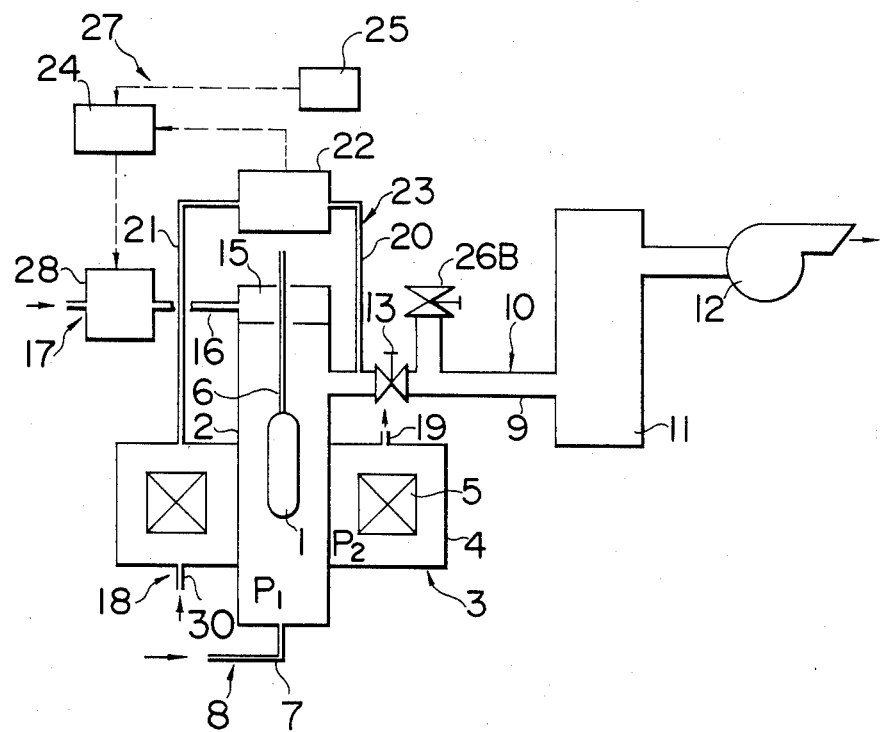

HEAT TREATING APPARATUS AND METHOD OF OPERATING HEAT TREATING APPARATUS

BACKGROUND OF THE INVENTION

This invention relates to a heat treating apparatus and method of operating the same for dehydrating and sintering, for example, an optical fiber preform (porous material) to fabricate a transparent optical fiber preform.

Heretofore, a heat treating apparatus for heat treating a material to be treated such as an optical fiber preform has, as shown in FIG. 4, a core tube 2 for containing and heating a porous optical fiber preform 1 of a material to be heated, and a furnace body 4 surrounding the outer periphery of the core tube 2, a heater 5 disposed in the body 4 for heating the preform 1 through the core tube 2. In this case, the preform 1 supported by a supporting rod 6 and disposed at the center of the core tube 2 is heated in a suitable gas atmosphere in the tube 2, dehydrated, and sintered to form a transparent preform. Predetermined gas is supplied by core tube gas supply means 8 having a feed conduit 7 to the core tube 2, and the reaction gas with the preform 1, moisture and excessive gas are intaken and exhausted from exhaust means 10 having an exhaust conduit 9 through an exhaust gas treating unit 11 via a blower 12. A throttle valve for regulating the strength of the exhaust gas from the core tube 2 and a pressure gauge 14 for monitoring the internal pressure in the tube 2 are ordinarily provided in the exhaust conduit 9 of the exhaust means 10.

Most of the core tube 2 is formed of a quartz to endure against high temperatures and to avoid detrimental impurities in the optical fiber. Carbon is used as a material for the heater 4 and as a heat insulating material of the interior of the body 4 to obtain sufficiently high temperatures in a heating furnace 3.

When the carbon is used at high temperatures, the carbon is oxidized in the air and loses its shape. Thus, the carbon must be used in nonoxygen atmosphere. This method requires inert gas inside the body 4. In this case, in order to prevent air from entering through a gap between the body 4 and the core tube 2 and prevent oxygen from diffusing, the pressure in the body 4 must be maintained at a higher level than the external pressure of the body 4.

However, since the core tube 2 is made of a quartz and is heated at high temperatures at the center of the body 4, the tube 2 is softened to be deformable, and might expand or contract due to the pressure relationship between the inside and the outside of the tube 2. The higher the temperature of heater 5, the easier tube deformation becomes at lower pressure differences.

More specifically, the core tube 2 expands in case of $P_1 - P_2 \geq K_1$, and the core tube 2 contracts in case of $P_1 - P_2 \geq K_2$, where $P_1$ is the pressure inside the tube 2, and $P_2$ is the pressure outside the tube 2, and $K_1$, $K_2$ are values determined according to the size and temperature of the core tube 2.

From the abovementioned fact, the apparatus must be operated by holding the pressure in the tube 2 in a range for not deforming the tube 2. Further, the pressure $P_1$ must not be higher nor lower than the lowest pressure $P_2$ necessary to prevent the carbon from oxidizing.

However, the pressure varies according to the alteration for setting the flow rate of atmospheric gas, or the temperature of the heater and the pressure in the tube 2 varies according to the variation in the pressure in the exhaust system. There thus arises a disadvantage that the variation in the pressure causes the tube 2 to collapse or be damaged and to disable the heat treatment.

SUMMARY OF THE INVENTION

Accordingly, an object of this invention is to provide a heat treating apparatus capable of preventing a core tube from deforming.

Another object of this invention is to provide a method of operating a heat treating apparatus capable of preventing a core tube from deforming.

According to one aspect of this invention, there is provided a heat treating apparatus comprising a core tube 2 for containing a preform 1 to be treated, a heating furnace 3 surrounding the core tube 2, core tube gas supply means 8 for supplying gas into the core tube 2, furnace body gas supply means 18 for supplying gas into a furnace body 4 of the furnace 3, differential pressure detecting means 23 for detecting the differential pressure between the pressure in the core tube 2 and the gas pressure in the body 4, and differential pressure regulating means 27 for regulating the differential pressure between the gas pressure in the core tube 2 and the gas pressure in the body 4 on the basis of a differential pressure signal from the detecting means 23.

According to another aspect of this invention, there is provided a method of operating a heat treating apparatus having a core tube 2 for containing a preform 1 to be treated, a heating furnace 3 surrounding the core tube 2, core tube gas supply means 8 for supplying gas into the core tube 2, and a furnace body gas supply means 18 for supplying gas into the body 4 of the heating furnace 3 comprising the step of regulating the gas pressure in the core tube 2 so that the differential pressure between the gas pressure in the core tube 2 and the gas pressure in the body 4 fall within a tolerable range.

When the differential pressure between the pressure in the core tube 2 and the pressure in the body 4 is detected as described above to set the differential pressure to the allowable range, it can prevent the core tube 2 from deforming due to the differential pressure therein.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is a schematic view showing the construction of a first embodiment of a heat treating apparatus according to the present invention;

FIG. 2 is a schematic view showing a second embodiment of the present invention;

FIG. 4 is a schematic view of the conventional heat treating apparatus.

DESCRIPTION OF THE PREFERRED EMBODIMENTS

Figure 3:
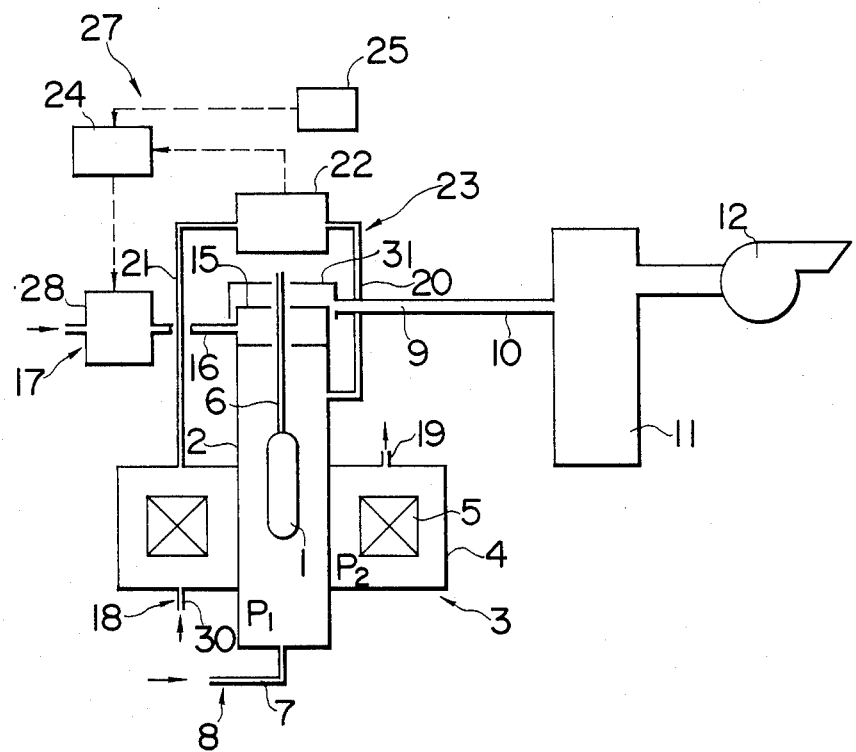
FIG. 3 is a schematic view showing a third embodiment of the invention.

Embodiments of a heat treating apparatus and a method of operating the apparatus according to the present invention will be described in detail with reference to FIGS. 1 to 3, wherein the same reference numerals designate the same or equivalent parts in the respective drawings.

FIG. 1 shows a first embodiment of the invention. In this embodiment, a sealing box 15 is provided at the end of a core tube 2 so as to seal the leading portion of a supporting rod 6 from the tube 2 to receive sealing gas from sealing box gas supply means having a feed conduit 16. Gas is supplied by furnace body gas supply means 18 having a feed conduit 30 to a furnace body 4, and exhausted from an exhaust port 19. Pressure conduits 20, 21 are respectively connected to an exhaust conduit 9 before a throttle valve 13 and the body 4 to detect the gas pressures in the tube 2 and the body 4. The gas pressures detected via the conduits 20, 21 are input to a differential pressure detector 22 to detect the differential pressure in between the core tube 2 and the body 4, i.e., the differential pressure between the interior and the exterior of the tube 2. The conduits 20, 21 and the detector 22 from differential pressure detecting means 23. A differential pressure signal (an electric signal or a pneumatic signal) from the means 23 is input to a controller 24, which compares the signal with a set signal level from a setter 25 to feed an operation signal to an automatic control valve 26A comprising a motor driven valve to regulate it in response to a deviation. Control regulating valve 26A is connected at the outlet side of the throttle valve 13 to the exhaust conduit 9 to regulate the feeding amount of external air by regulating to open and close the valve, thereby regulating the pressure at the outlet side of the valve 13. The controller 24, the setter 25 and the control valve 26A form differential pressure regulating means 27 to regulate the internal pressure in the core tube 2 such that it is greater than that in the body 4 by 0 to 6 mm $H_2O$.

In the embodiment described above, the flow rates of the gases from the core tube gas supply means 8, the furnace body gas supply means 18 and the sealing box gas supply means 17 are maintained constant, and the intake amount of the blower 12 is also held constant. The differential pressure of the gas pressure between the core tube 2 and the body 4 is detected by the detector 22 through the conduits 20, 21 in this state. A deviation between the detected differential pressure signal and the set signals from the setter 25 is detected by the controller 24, and the opening degree of the valve 26A automatically varies in response to the difference. When the opening of the valve 26A varies, the pressure at the outlet side of the throttle valve 13 is altered and the pressure in the core tube 2 is regulated by the alteration so that the differential pressure falls within the tolerable range.

In the heat treating apparatus constructed as described above, the control is performed as below when the gas flow rate varies from the core tube gas supply means 8, the temperature from the heater 5 varies, the pressure in the exhaust system alters so that the differential pressure $(P_1-P_2)$ between the pressure $P_2$ in the core tube 2 and the pressure $P_1$ of the body 4 decreases or increases.

When the differential pressure $(P_1-P_2)$ decreases, a control for increasing the opening of control valve 26A is conducted to weaken the intaking strength from the blower 12 side to raise the pressure at the outlet side of the valve 13, the pressure $P_1$ in the core tube 2 increases to increase the differential pressure $(P_1-P_2)$, thereby controlling the differential pressure and causing it to fall within the tolerable range.

When the differential pressure $(P_1-P_2)$, on the contrary, increases, a control for decreasing the opening of the valve 26A is conducted to increase the intaking strength from the blower 12 side to lower the pressure at the outlet side of the valve 13, the pressure $P_1$ in the core tube 2 decreases to decrease the differential pressure $(P_1-P_2)$, thereby controlling the differential pressure and causing it to fall within the tolerable range.

When the apparatus is controlled as described above, the differential pressure between the interior and the exterior of the core tube 2 can be always maintained at the value within the tolerable range or at the suitable value, and no carbon oxidation or core tube 2 deformation occurs, thereby stably heat-treating the optical fiber preform 1.

FIG. 2 shows a second embodiment of the present invention. In this embodiment, a manual regulating valve 26B is provided at the exhaust conduit 9 at the outlet side of a throttle valve 13, and the opening of the valve is fixed. A flow rate controller 28 is provided in the course of a feed conduit 16 in sealing gas supply means 17, and sealing gas is supplied through the controller 28. The output of a controller 24 is input as a flow rate set signal to the controller 28. A mass flow controller may be used as the controller 28. The other construction is similar to that shown in FIG. 1.

In the embodiment described above, the gas flow rate from the furnace body gas supply means 18 and the openings of the valves 13, 26B are maintained constant, a deviation between the detected value of the differential pressure $(P_1-P_2)$ and the set value from the setter 25 is detected by a differential pressure detector 22, and the flow rate set value of the controller 28 varies in response to the deviation, thereby varying the flowing gas flow rate to the sealing box 15.

The internal pressure in the core tube 2 is regulated by the difference so that the differential pressure $(P_1-P_2)$ falls within the tolerable range or at the suitable value (normally the pressure $P_1$ is increased by 0 to 6 mm$H_2O$ more than the pressure $P_2$).

In the heat treating apparatus of the embodiment as described above, when the gas flow rate from the core tube gas supply means 8 varies, the temperature of the heater 5 varies and the pressure in the exhaust system alters so that the differential pressure $(P_1-P_2)$ decreases or increases, the apparatus controls the differential pressure as described herein below.

When the differential pressure $(P_1-P_2)$ decreases, the set flow rate of the flow rate controller 28 increases to raise the pressure $P_1$ of the core tube 2 to thus increase the differential pressure $(P_1-P_2)$, thereby controlling to fall within the tolerable range.

On the contrary, when the differential pressure $(P_1-P_2)$ increases, the set flow rate of the flow rate controller 28 decreases to reduce the pressure $P_1$ of the core tube 2 to thus decrease the differential pressure $(P_1-P_2)$, thereby controlling the differential pressure and causing it to fall within the tolerable range.

FIG. 3 shows a third embodiment of the invention. In this embodiment, a hood 31 is provided to cover a sealing box 15, and a gap between the box 15 and a supporting rod 6 is fixed. Similar to the case of FIG. 2, a flow rate controller 28 is provided in the course of a feed conduit 16 in the sealing gas supply means 17, and sealing gas is supplied through the controller 28. The output of the controller 24 is input as a flow rate set signal to the controller 28. An exhaust conduit 9 is connected to the hood 31, and the exhaust gas treating unit 11 and a blower 12 constructed in the same manner as those in FIGS. 1 and 2 are connected to the exhaust conduit 9. In this embodiment, atmospheric gas is fed from a gap between the hood 31, the sealing box 15 and the supporting rod 6, the gas flow rate supplied to the box 15 is controlled by the controller 28 in response to the value of the differential pressure ($P_1 - P_2$) fundamentally in the same manner as the second embodiment, the pressure in the tube 2 is altered by varying the pressure in the box 15, thereby controlling the differential pressure and causing it to fall within the tolerable range or at the suitable value.

There is a method of varying only the intake strength of the blower 12 by fixing the valve 26A in addition to the throttle valve 13 in the first embodiment, a method of controlling only the intake strength of the blower 12 similar to the above by fixing the sealing gas supply amount by the controller 28 in addition to the throttle valve 13 and the valve 26B in the second embodiment, and a method of varying only the intake strength of the blower 12 by fixing the sealing gas supply amount by the controller 28 in addition to the gap between the hood 31 and the box 15 and the gap between the hood 31 and supporting rod 6 in the third embodiment. In these cases, the blower 12 may preferably alter the intake strength by controlling the rotating speed.

In the embodiments described above, when the differential pressure is controlled at the valves 26A, 26B and on the flow rate controller 28 side, there is an advantage that the amount of the gas supplied into the core tube 2 to be required for the heat treatment can be regulated, and fine control can be stably performed.

The control may be performed manually at suitable lines while observing the differential pressure. The preform 1 is not limited to the optical fiber preform in this invention, and may be, for example, semiconductor or any other material to be treated.

According to the present invention as described above, the differential pressure between the gas pressure in the core tube and the pressure in the furnace body surrounding the core tube is detected to control the differential pressure thereby causing it to fall within the tolerable range. Therefore, it can prevent the core tube from deforming due to the differential pressure to stably heat treat the preform.

What is claimed is:

1. A heat treating apparatus comprising:
   a core tube for containing a material to be treated, the core tube being supplied with gas from a core tube gas supply means;
   a heating furnace surrounding the core tube, the heating furnace being supplied with gas from a gas supply means and the heating furnace being sealed with respect to the core tube;
   differential pressure detecting means for detecting the differential pressure between the pressure in the core tube and the pressure in the heating furnace; and
   differential pressure regulating means for regulating the differential pressure between the gas pressure in the core tube and the gas pressure in the heating furnace in response to a differential pressure signal received from the differential pressure detecting means, the differential pressure regulating means comprising an exhaust conduit communicating at one end with the core tube and communicating at another end with a means for exhausting the core tube gas through the exhaust conduit to the atmosphere and an adjusting means operatively connected with the exhaust conduit for adjustably feeding external air into the conduit in response to the differential pressure signal.

2. The heat treating apparatus according to claim 1, wherein the adjusting means is a manual regulating valve.

3. A heat treating apparatus as claimed in claim 1, wherein the exhaust conduit is provided with a throttle valve located intermediate the core tube and the adjusting means.

4. A method of operating a heat treating apparatus having a core tube for containing a material to be treated, a heating furnace surrounding the core tube, core tube gas supply means for supplying gas into the core tube, the core tube communicating with an exhaust conduit, the exhaust conduit communicating with a means for exhausting core tube gas through the conduit to the atmosphere and being provided with an adjusting means for adjustably feeding external air to the exhaust conduit, and a gas supply means for supplying gas into the heating furnace comprising the step of:
   regulating the gas pressure in the core tube by adjustably feeding external air to the exhaust conduit so that the differential pressure between the gas pressure in the core tube and the gas pressure in the heating furnace falls within a range in which the core tube does not deform and the heating furnace does not oxidize.

* * * * *